(12) United States Patent
Subramani

(10) Patent No.: US 10,691,614 B1
(45) Date of Patent: Jun. 23, 2020

(54) ADAPTIVE PAGE REPLACEMENT

(71) Applicant: TIBCO Software Inc., Palo Alto, CA (US)

(72) Inventor: Suresh Subramani, San Jose, CA (US)

(73) Assignee: TIBCO SOFTWARE INC., Palo Alto, CA (US)

(*) Notice: Subject to any disclaimer, the term of this patent is extended or adjusted under 35 U.S.C. 154(b) by 0 days.

(21) Appl. No.: 15/812,784

(22) Filed: Nov. 14, 2017

Related U.S. Application Data

(60) Provisional application No. 62/424,331, filed on Nov. 18, 2016.

(51) Int. Cl.
| | |
|---|---|
| *G06F 12/00* | (2006.01) |
| *G06F 12/08* | (2016.01) |
| *G06F 13/00* | (2006.01) |
| *G06F 12/122* | (2016.01) |
| *G06F 12/128* | (2016.01) |

(52) U.S. Cl.
CPC ........ *G06F 12/122* (2013.01); *G06F 12/128* (2013.01); *G06F 2212/621* (2013.01)

(58) Field of Classification Search
CPC .............. G06F 12/122; G06F 12/128

USPC .......................................... 711/134
See application file for complete search history.

(56) References Cited

U.S. PATENT DOCUMENTS

| | | | | |
|---|---|---|---|---|
| 9,208,086 | B1* | 12/2015 | Shalev | G06F 12/0871 |
| 2002/0108020 | A1* | 8/2002 | Take | G06F 12/0866 711/119 |
| 2012/0210066 | A1* | 8/2012 | Joshi | G06F 12/0866 711/118 |
| 2013/0111129 | A1* | 5/2013 | Maki | G06F 3/0611 711/117 |
| 2014/0082288 | A1* | 3/2014 | Beard | G06F 12/0875 711/123 |

* cited by examiner

*Primary Examiner* — Mohamed M Gebril
(74) *Attorney, Agent, or Firm* — McGuireWoods LLP

(57) ABSTRACT

Techniques to manage virtual memory are disclosed. In various embodiments, a time domain page access signal of a page is transformed to a frequency domain to obtain an access frequency. The access frequency is used to manage storage of the page in a page cache in memory. The access frequency may be used to evict the page from the page cache or, in some embodiments, to predictively load the page into the page cache.

18 Claims, 5 Drawing Sheets

ADAPTIVE PAGE REPLACEMENT

CROSS REFERENCE TO OTHER APPLICATIONS

This application claims priority to U.S. Provisional Patent Application No. 62/424,331 entitled ADAPTIVE PAGE REPLACEMENT filed Nov. 18, 2016 which is incorporated herein by reference for all purposes.

BACKGROUND OF THE INVENTION

Virtual memory management is a technique used to provide applications and/or other processes with a contiguous (virtual) address space. Virtual addresses are mapped to physical storage, from which data stored at the virtual address may be accessed.

The virtual address space may be larger than the available physical address space, which is limited by the size of the physical memory. Data may be written to secondary, non-volatile storage, such as a disk drive, and may be read into memory as needed.

To read/write data efficiently, data may be organized, read, and/or written as "pages", the size of which may be determined at least in part based on characteristics of the secondary storage.

Page caching techniques may be used to determine and keep track of which pages comprising the virtual address space are stored in memory at any given point in time. A page table typically is used to keep track of which pages are stored where. Page replacement algorithms, such as "least recently used", typically are used to determine which pages to purge from the page cache to make room for pages comprising data that has been requested to be accessed. In addition to "least recently used", conventional page replacement algorithms include FIFO (first in, first out); Second Chance Algorithm, Counting, Least Frequently Used (LFU); and Most Frequently Used (MFU). A "page manager" or "page supervisor" typically is used to implement the page replacement strategy/algorithm selected to be used in a given system and/or context.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An adaptive, time signal based approach to virtual memory management is disclosed. In various embodiments, an adaptive page manager implements a conventional page replacement strategy during a learning period. During the learning period, page access statistics are gathered and processed to provide for each of at least a subset of pages a corresponding time signal. A transform, such as the Fourier transform, is applied to the time domain information to produce a set of frequencies for each page (node). In some embodiments, a scheduler or other module uses the frequency set information to predictively pre-load pages into the page cache (memory). In some embodiments, an evictor or other module may use the frequency set information to determine at least in part when to evict a given page from the cache. For example, a page in the cache that based on frequency set information is not expected to be required for a relatively long time may be more likely to be evicted than a page that may be accessed sooner.

Figure 1:
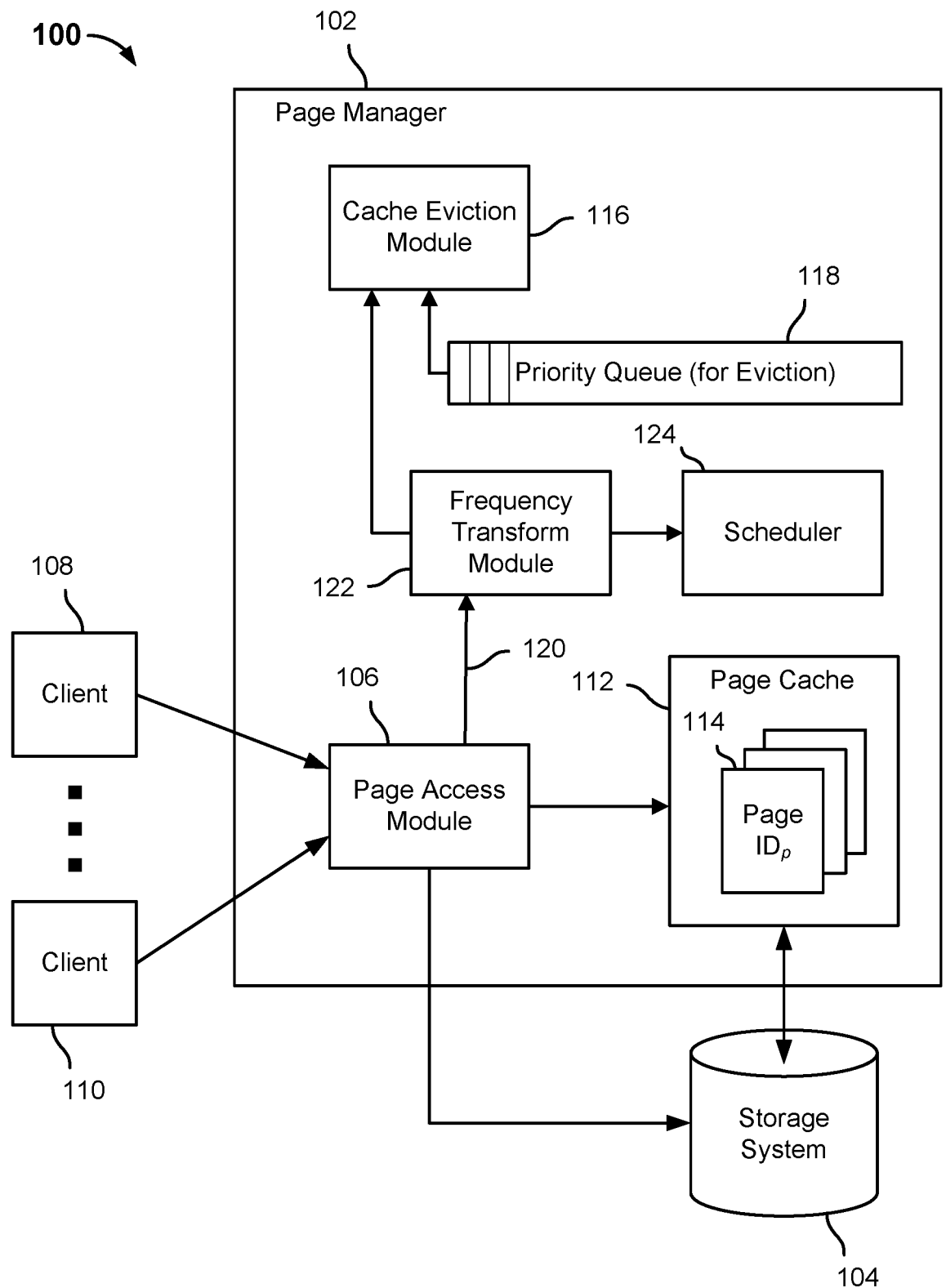
FIG. 1 is a block diagram illustrating an embodiment of a virtual memory management system.

FIG. 1 is a block diagram illustrating an embodiment of a virtual memory management system. In the example shown, virtual memory management system 100 includes a page manager 102. Page manager 102 may be implemented as a software module running on a general purpose or special purpose computer. Page manager 102 manages access to data stored in storage system (or device) 104, organized as a plurality of pages. A page access module 106 receives and processes requests by clients, represented in FIG. 1 by clients 108 and 110, to access (e.g., to read, write, etc.) data stored in storage system 104. Upon receiving a request to access data comprising a page, page access module 106 first checks an in-memory page cache 112 to determine whether the required page is among the pages 114 currently in the cache. Each page may be identified by a page identifier (page ID), which may be used to manage access to pages, such as to retrieve and/or write pages to storage system 104 and/or to manage page cache 112.

Page manager 102 includes a cache eviction module 116 to remove pages from page cache 112, e.g., to make room for other pages 114 to be read from storage system 104 and stored in page cache 112. For example, page cache 112 may become full, and a request from a client 108, 110 may require access to a page not currently in page cache 112. Page eviction module 116 uses a priority queue 118 to determine which page(s) to next evict. In some embodiments, priority queue 116 is implemented as a heap memory. Each entry in priority queue 116 may include a transient access header used to store data reflecting access to the page, such as a timestamp, counter value, or other data reflecting page access. Cache eviction module 116 may use the transient access headers to determine which page(s) to next evict from page cache 112.

Using prior art approaches, at design time engineers typically would choose and implement a static page replacement algorithm, such as one or more of Least Recently Used (LRU); FIFO (first in, first out); Second Chance Algorithm, Counting, Least Frequently Used (LFU); and Most Frequently Used (MFU). However, regardless of the algorithm selected actual page access patterns may result in a higher than desired number of page cache "misses", i.e., access requests for pages not already in the page cache 112, resulting in delay (latency) while the page manager 102 reads the page from the storage system 104.

To improve system performance, for example by minimizing page cache misses and associated latency, techniques are disclosed to adapt to actual, observed page access patterns. In various embodiments, page access module 106 is configured to capture page access pattern information, e.g., data representing for each page a pattern of access over an observation period. In the example shown, time domain page access information 120 is provided to a frequency transform module 122. Frequency transform module 122 is configured, in various embodiments, to use the time domain information 120 to determine for each page a corresponding set of frequency domain information for the corresponding observed time domain access information 120. In some embodiments, frequency transform module 122 is configured to implement and perform Discrete Fourier Transform (DFT) processing to transform time signal information 120 to the frequency domain.

In the example shown, frequency transform module 122 provides per-page access frequency information to cache eviction module 116. In various embodiments, cache eviction module 116 uses the frequency domain information to prioritize page eviction. In some embodiments, cache eviction module 116 uses frequency domain page access information to update access counters and/or other values in transient access headers and/or other data structures used to represent and prioritize cached pages in priority queue 118. For example, in some embodiments, page access frequency information may be used to change a value associated with actual page access (e.g., most recent access time and/or counter value) to a value determined based on access frequency.

Take for example a page that (typically) is accessed daily at 7-7:30 am and 2-2:30 pm, and once every week at 6-6:30 pm. Suppose further the page is read and written to actively for about thirty minutes daily at 7-7:30 am and 2-2:30 pm, and read once (e.g., for backup) weekly at 6-6:30 pm. In various embodiments, techniques disclosed herein may be used to determine a frequency set to describe the above access patterns. An access that occurs in the 7-7:30 am window or the 2-2:30 pm window may result in the frequency set information being used to keep the page in the page cache for approximately thirty minutes (or somewhat more), after which the expectation, based on the frequency set, that the page will not be access for an extended period may be used to evict the page from the page cache, potentially earlier than other page replacement algorithms may have evicted the page. Eviction of the page based on the frequency set information would make room for other pages that may be accessed to remain and/or be predictively loaded into the page cache, based on the respective frequency set data of such pages, reducing cache misses and associated latency. Likewise, the page described above may be loaded into the page cache predictively, based on the frequency set information that represents the described access pattern.

Referring further to FIG. 1, in the example shown page manager 102 includes a scheduler 124. Scheduler 124 may be implemented as a software process or module. Frequency transform module 122 provides to scheduler 124 frequency domain page access information generated by frequency transform module 122 based on time domain page access information 120. In various embodiments, scheduler 124 uses frequency domain page access information to cause pages that are expected to be accessed soon, based on the frequency domain page access information, to be read in advance of the access request and stored in page cache 112. For example, a last access time and the access frequency information may be used to predict a next access time, and to schedule a time to read the page and store the page in page cache 112 in anticipation of the expected page access request. One or both of the cache eviction module 116 and the scheduler 124 may adjust one or more values associated with the page, e.g., in a transient access header as stored to represent the page in priority queue 118.

Figure 2:
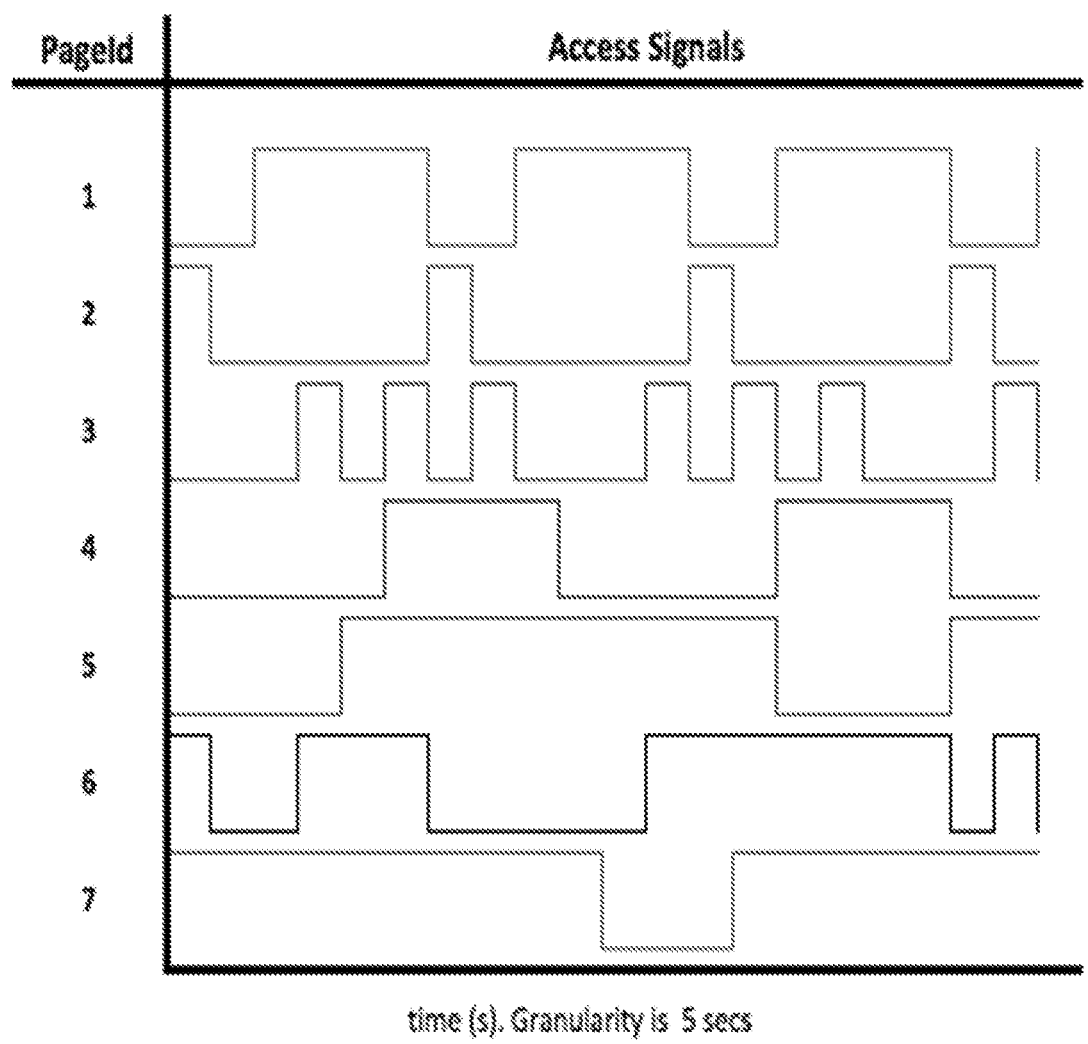
FIG. 2 is a diagram illustrating page access patterns in an embodiment of a virtual memory management system.

FIG. 2 is a diagram illustrating page access patterns in an embodiment of a virtual memory management system. In the example shown, signal diagram 200 shows conceptually an example of how page access patterns may vary over time across pages. In this example, each of seven pages has a distinct time domain access signal. The rising edge may reflect a page access and the trailing (1 to 0) edge may reflect no further access within a prescribed time. In various embodiments, transformation into the frequency domain enables an adaptive page manager as disclosed herein, such as page manager 102 of FIG. 1, to determine one or more access frequencies for each page, and to use the frequency information to manage one or both of page eviction and predictive reading to minimize page cache misses.

Figure 3:
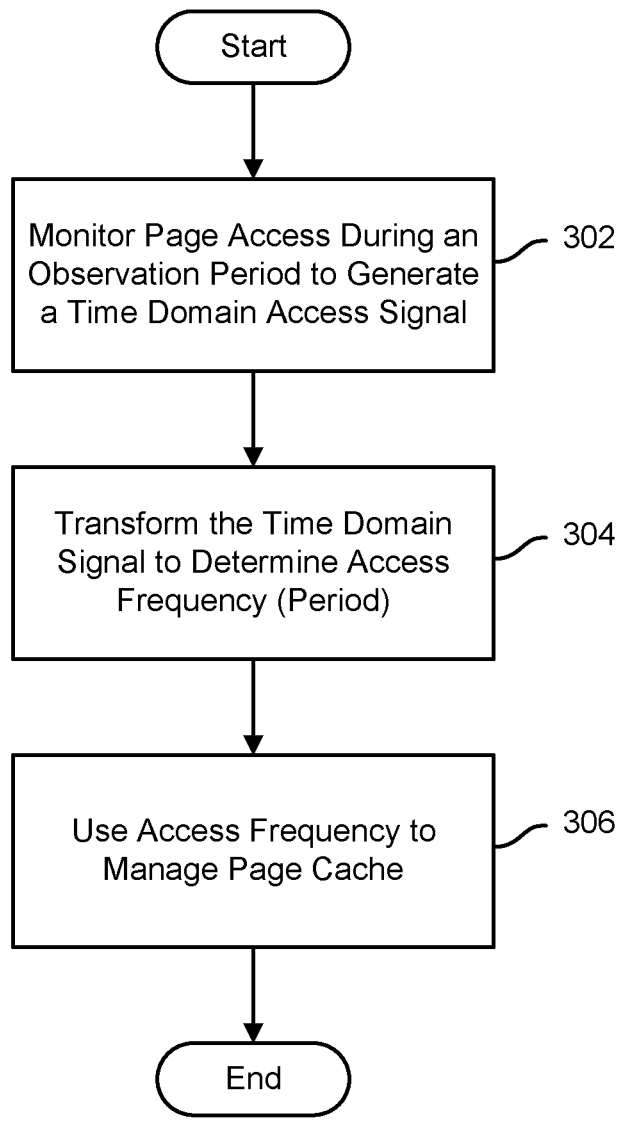
FIG. 3 is a flow chart illustrating an embodiment of a process to manage virtual memory.

FIG. 3 is a flow chart illustrating an embodiment of a process to manage virtual memory. In various embodiments, the process of FIG. 3 is implemented by a page manager, such as page manager 102 of FIG. 1. In the example shown, page accesses are monitored during an observation period to generate for each of a plurality of pages a time domain access signal (302). The time domain signal is transformed to determine access frequency(ies) (304). The frequency domain information is used to manage a page cache (306), e.g., to manage one or both of page eviction and scheduled pre-access request retrieval of one or more pages.

Figure 4:
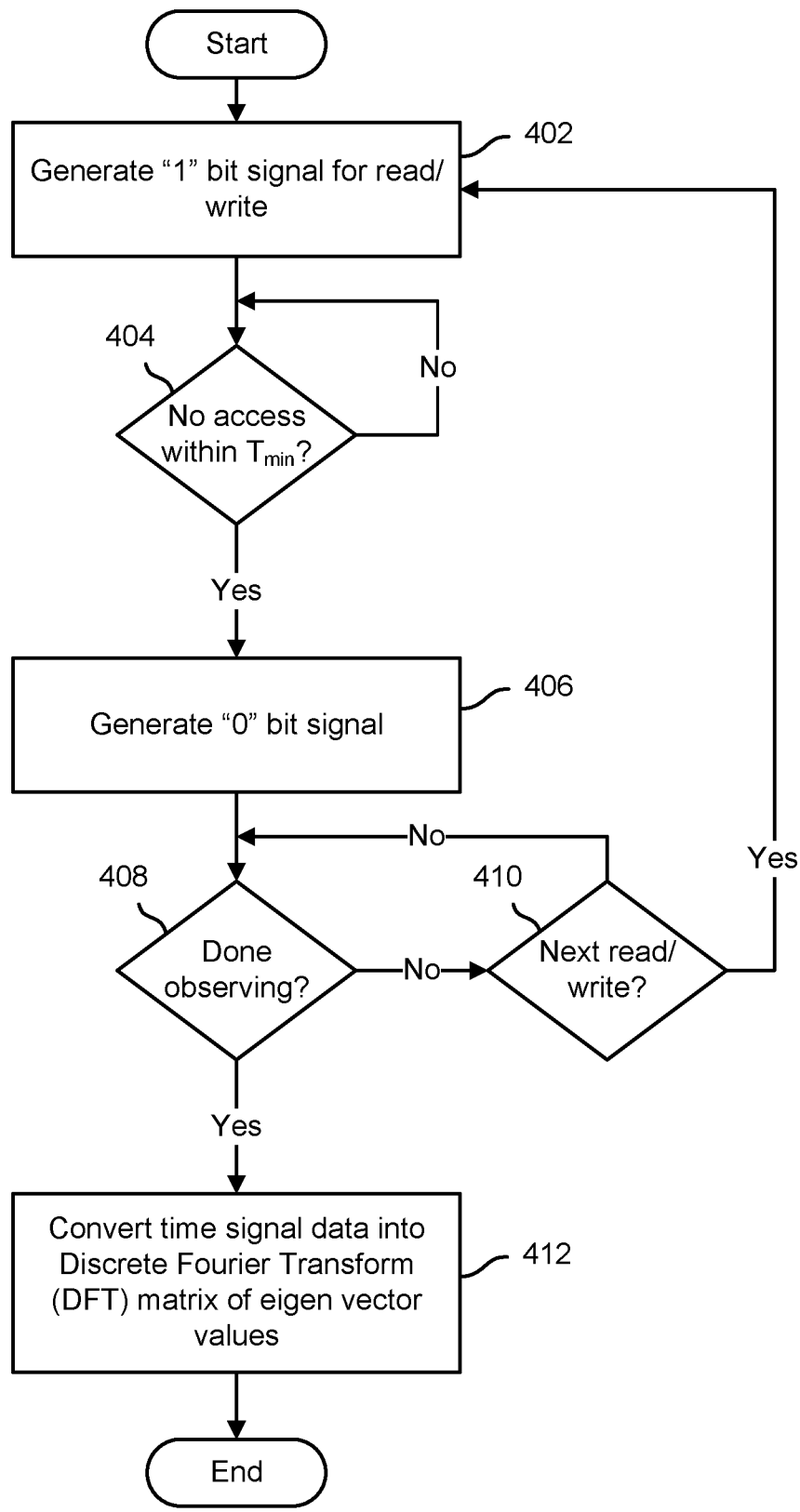
FIG. 4 is a flow chart illustrating an embodiment of a process to learn page access frequency in an embodiment of a memory management system.

FIG. 4 is a flow chart illustrating an embodiment of a process to learn page access frequency in an embodiment of a memory management system. In various embodiments, the process of FIG. 4 may be used to implement one or both of 302 and 304 of FIG. 3. In the example shown, a "1" bit signal is generated and stored for each access (e.g., read, write) of a page (402). If there is no access within a prescribed interval (404), a "0" bit signal is generated and stored (406). If before the observation period ends (408) a read/write to the page is detected (410), a "1" bit signal is generated and stored (402). Once the observation period ends (408), the time signal data (402, 406) is converted into a Discrete Fourier Transform (DFT) matrix of eigen vector values (412). In various embodiments, the DFT matrix is used to transform the time domain data into the frequency domain, as in 304 of FIG. 3.

Figure 5:
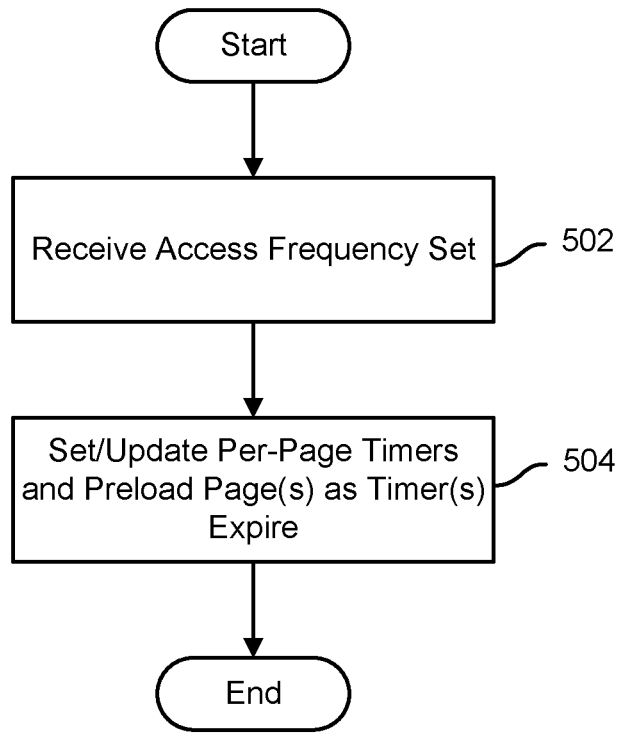
FIG. 5 is a flow chart illustrating an embodiment of a process to use page access frequency information to preload pages.

FIG. 5 is a flow chart illustrating an embodiment of a process to use page access frequency information to preload pages. In various embodiments, the process of FIG. 5 may be performed by a scheduler component of a page manager, such as scheduler 124 of FIG. 1. In the example shown, an access frequency set is received (502). For example, access frequencies determined by a frequency transform module, such as frequency transform module 122 of FIG. 1, may be received. The frequency information is used to set and/or update per-page timers, and to preload (into a page cache) pages as their respective timers expire (504). In some embodiments, a scheduling mechanism other than timers may be used to preload pages based on access frequency information.

Figure 6:
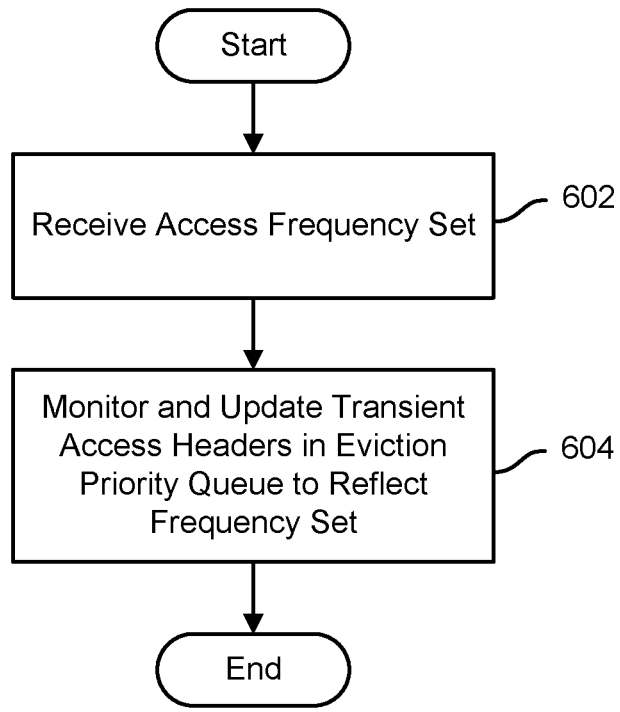
FIG. 6 is a flow chart illustrating an embodiment of a process to use page access frequency information to schedule pages for eviction from a page cache.

FIG. 6 is a flow chart illustrating an embodiment of a process to use page access frequency information to schedule pages for eviction from a page cache. In various embodiments, the process of FIG. 6 may be performed by a cache eviction module component of a page manager, such as cache eviction module 116 of FIG. 1. In the example shown, an access frequency set is received (602). For example, access frequencies determined by a frequency transform module, such as frequency transform module 122 of FIG. 1, may be received. The frequency information is used to monitor and update transient access headers in an eviction priority queue (604), such as priority queue 118 of FIG. 1. For example, access counter and/or other access time values may be adjusted, based on predictions of future page access based on the frequency information, to delay eviction of a page that is in the page cache and is expected to be accessed sometime soon and/or to hasten the eviction of a page not expected to be accessed any time soon, e.g., to make room to retain or pre-fetch pages that are expected, based on the access frequency(ies) associated with those pages, to be accessed sometime soon.

In various embodiments, an adaptive approach to virtual memory management as disclosed herein improves system performance by reducing page cache "misses". Using techniques disclosed herein, a requested page (e.g., one needed to read, write, etc.) is more likely to be found in the page cache, enabling the request to be serviced more quickly and without waiting for input/output operations to a backend storage system or device to be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A virtual memory management system, comprising:
a memory configured to store pages in a page cache; and
a processor coupled to the memory and configured to:
generate a time domain page access signal of a page using page access statistics gathered during a learning period;
transform the time domain page access signal of the page to a frequency domain to obtain an access frequency; and
use the access frequency to replace the page in the page cache based on the access frequency;
wherein the time domain page access signal includes rising edge information that reflects a page access and trailing edge information that reflects no further access of the page.

2. The virtual memory management system of claim 1, wherein the processor is configured to use the access frequency to management storage of the page in the page cache at least in part by managing eviction of the page from the page cache based at least in part on the access frequency.

3. The virtual memory management system of claim 2, wherein managing eviction of the page from the page cache based at least in part on the access frequency includes causing the page to remain in the page cache based at least in part on a page access predicted to occur at a future time determined based at least in part on the access frequency.

4. The virtual memory management system of claim 2, wherein managing eviction of the page from the page cache based at least in part on the access frequency includes causing the page to be evicted from the page cache based at least in part on a determination made based at least in part on the access frequency that a predicted next access of the page will not occur for greater than a prescribed time.

5. The virtual memory management system of claim 1, wherein the processor is configured to use the access frequency to management storage of the page in the page cache at least in part by causing the page to be pre-loaded into the page cache based at least in part on a page access predicted to occur at a future time determined based at least in part on the access frequency.

6. The virtual memory management system of claim 1, wherein the processor is configured to use a discrete Fourier transform (DFT) to transform the time domain page access signal of a page to a frequency domain to obtain an access frequency.

7. The virtual memory management system of claim 1, wherein the processor is configured to generate the time domain page access signal of the page at least in part by monitoring page accesses of the page and storing for each access a bit signal corresponding to page access.

8. The virtual memory management system of claim 1, wherein the processor is configured to generate the time domain page access signal of the page at least in part by monitoring page accesses of the page and storing a bit signal corresponding to no page access based at least in part on a determination that a prescribed interval has passed with no access to the page.

9. The virtual memory management system of claim 1, wherein the processor is configured to use the access frequency to manage storage of the page in the page cache at least in part by updating metadata in an eviction priority queue.

10. A method to manage a virtual memory, comprising:
generating a time domain page access signal of a page using page access statistics gathered during a learning period;
transforming the time domain page access signal of the page to a frequency domain to obtain an access frequency; and
using, by the processor, the access frequency to replace the page in a page cache in memory based on the access frequency;
wherein the time domain page access signal includes rising edge information that reflects a page access and trailing edge information that reflects no further access of the page.

11. The method of claim 10, wherein the processor is configured to use the access frequency to management storage of the page in the page cache at least in part by managing eviction of the page from the page cache based at least in part on the access frequency.

12. The method of claim 11, wherein managing eviction of the page from the page cache based at least in part on the access frequency includes causing the page to remain in the page cache based at least in part on a page access predicted to occur at a future time determined based at least in part on the access frequency.

13. The method of claim 11, wherein managing eviction of the page from the page cache based at least in part on the access frequency includes causing the page to be evicted from the page cache based at least in part on a determination made based at least in part on the access frequency that a predicted next access of the page will not occur for greater than a prescribed time.

14. The method of claim 10, wherein the processor is configured to use the access frequency to management storage of the page in the page cache at least in part by causing the page to be pre-loaded into the page cache based at least in part on a page access predicted to occur at a future time determined based at least in part on the access frequency.

15. The method of claim 10, wherein the processor is configured to use a discrete Fourier transform (DFT) to transform the time domain page access signal of a page to a frequency domain to obtain an access frequency.

16. A computer program product to manage a virtual memory, the computer program product being embodied in a non-transient computer readable medium and comprising computer instructions to:
generate a time domain page access signal of a page using page access statistics gathered during a learning period;
transform the time domain page access signal of the page to a frequency domain to obtain an access frequency; and
use the access frequency to replace the page in a page cache in memory based on the access frequency;
wherein the time domain page access signal includes rising edge information that reflects a page access and trailing edge information that reflects no further access of the page.

17. The computer program product of claim 16, wherein using the access frequency to management storage of the page in the page cache includes managing eviction of the page from the page cache based at least in part on the access frequency.

18. The computer program product of claim 16, wherein using the access frequency to management storage of the page in the page cache includes causing the page to be pre-loaded into the page cache based at least in part on a page access predicted to occur at a future time determined based at least in part on the access frequency.

* * * * *